(12) United States Patent
Kim et al.

(10) Patent No.: US 11,691,624 B2
(45) Date of Patent: Jul. 4, 2023

(54) METHOD AND DEVICE FOR CONTROLLING DECELERATION OF ENVIRONMENTALLY FRIENDLY VEHICLE

(71) Applicants: HYUNDAI MOTOR COMPANY, Seoul (KR); KIA MOTORS CORPORATION, Seoul (KR)

(72) Inventors: Do Hee Kim, Yongin-si (KR); Jeong Soo Eo, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 226 days.

(21) Appl. No.: 17/108,607

(22) Filed: Dec. 1, 2020

(65) Prior Publication Data
US 2022/0073074 A1    Mar. 10, 2022

(30) Foreign Application Priority Data
Sep. 4, 2020  (KR) .................. 10-2020-0112892

(51) Int. Cl.
*B60W 30/18*     (2012.01)
*B60W 40/105*    (2012.01)
(Continued)

(52) U.S. Cl.
CPC .......... *B60W 30/181* (2013.01); *B60W 10/08* (2013.01); *B60W 30/18127* (2013.01); *B60W 40/04* (2013.01); *B60W 40/105* (2013.01); *B60W 2554/802* (2020.02); *B60W 2556/45* (2020.02)

(58) Field of Classification Search
CPC ............... B60W 30/181; B60W 10/08; B60W 30/18127; B60W 40/04; B60W 40/105; B60W 2554/802; B60W 2556/45; B60W 2510/1005; B60W 2520/10; B60W 10/11; B60W 10/06; B60W 2720/103; B60W 30/18154; B60W 30/18072; B60W 2050/0001; B60W 2510/083; B60W 2555/60; B60W 2556/50; B60W 2556/65;
(Continued)

(56) References Cited

U.S. PATENT DOCUMENTS 9,827,955 B2 *  11/2017  Miller ................ B60W 20/12

FOREIGN PATENT DOCUMENTS

DE   112012001799 B4 *  1/2014  .......... B60W 10/184
KR   20210031066 A *  3/2021  .......... B60W 30/181

* cited by examiner

*Primary Examiner* — Brian P Sweeney
(74) *Attorney, Agent, or Firm* — McDonnell Boehnen Hulbert & Berghoff LLP

(57) ABSTRACT

A method for controlling deceleration of a vehicle includes determining, by a controller, a reference deceleration driving distance of the vehicle based on current speed information of the vehicle and stop signal residual time information of a traffic light located ahead of the vehicle, determining, by the controller, whether the reference deceleration driving distance is less than or equal to a distance between the vehicle and the traffic light, and determining, by the controller, a speed profile including an actual deceleration driving distance of the vehicle based on a waiting distance of a waiting vehicle that waits before the traffic light when it is determined that the reference deceleration driving distance is less than or equal to the distance between the vehicle and the traffic light.

8 Claims, 6 Drawing Sheets

(51) Int. Cl.
 *B60W 40/04* (2006.01)
 *B60W 10/08* (2006.01)
(58) Field of Classification Search
 CPC ............ B60Y 2200/91; B60Y 2200/92; B60Y 2300/18066; Y02T 90/40
 See application file for complete search history.

METHOD AND DEVICE FOR CONTROLLING DECELERATION OF ENVIRONMENTALLY FRIENDLY VEHICLE

CROSS-REFERENCE TO RELATED APPLICATION

This application claims priority to and the benefit of Korean Patent Application No. 10-2020-0112892 filed on Sep. 4, 2020, the entire contents of which are incorporated herein by reference.

TECHNICAL FIELD

The present disclosure relates to an environment-friendly vehicle, and more particularly, to a method and device for controlling deceleration of an environment-friendly vehicle.

BACKGROUND

Environmentally friendly vehicles include fuel cell vehicles, electric vehicles, plug-in electric vehicles, and hybrid vehicles, and generally include a motor for generating driving force.

A hybrid vehicle, an example of the environmentally friendly vehicles, uses an internal combustion engine and battery power together. That is, the hybrid vehicle efficiently uses a combination of power of the internal combustion engine and power of the motor.

The hybrid vehicle may include an engine, a motor, an engine clutch that regulates power between the engine and the motor, a transmission, a differential gear device, a battery, a starting generator that starts the engine or generates power by power output of the engine, and a wheel.

In addition, the hybrid vehicle may include a hybrid control unit that controls an overall operation of the hybrid vehicle, an engine control unit that controls an operation of the engine, a motor control unit that controls an operation of the motor, a transmission control unit that controls an operation of the transmission, and a battery control unit that controls and manages the battery.

The battery control unit may be referred to as a battery management system. The starting generator is also referred to as an integrated starter & generator (ISG) or a hybrid starter & generator (HSG).

The hybrid vehicle as described above may operate in a driving mode such as an electric vehicle (EV) mode, which is a pure electric vehicle mode using only power of the motor, a hybrid electric vehicle (HEV) mode) using rotational power of the engine as main power and rotational power of the motor as auxiliary power, and a regenerative braking mode in which braking and inertial energy is recovered through power generation of the motor and charged to the battery when the vehicle is driving based on braking or inertia.

The above information disclosed in this Background section is only for enhancement of understanding of the background of the disclosure, and therefore it may contain information that does not form the prior art that is already known in this country to a person of ordinary skill in the art.

SUMMARY

The present disclosure provides a method and device for controlling deceleration of an environmentally friendly vehicle capable of determining a speed profile of a vehicle including an actual deceleration driving distance of a vehicle between the vehicle due to a traffic light and the traffic light based on traffic light information ahead of the vehicle and a standby distance of a vehicle which is waiting or stops before the traffic light in front of the vehicle.

An exemplary embodiment of the present disclosure provides a method for controlling deceleration of an environmentally friendly vehicle including: determining, by a control unit, a reference deceleration driving distance of the vehicle based on current speed information of the vehicle and stop signal residual time information of a traffic light located ahead of the vehicle; determining, by the control unit, whether the reference deceleration driving distance is smaller than or equal to a distance between the vehicle and the traffic light; and determining, by the control unit, a speed profile including an actual deceleration driving distance of the vehicle based on a waiting distance of a waiting vehicle waiting before the traffic light when the reference deceleration driving distance is smaller than or equal to the distance between the vehicle and the traffic light.

The speed profile may include an actual deceleration driving time of the vehicle calculated using the actual deceleration driving distance.

The stop signal residual time information of the traffic light may be provided by a server located outside the vehicle.

The method may further include: transmitting, by each of the vehicle and the waiting vehicle, code information of the vehicle and the waiting vehicle, distance information between a foremost vehicle among vehicles including the waiting vehicle and the traffic light, and distance information between the waiting vehicles to a server located outside the vehicle through wireless communication; and determining, by the server, a longitudinal length of the vehicle corresponding to code information of the vehicle and the waiting vehicle using a longitudinal length of the vehicle according to the vehicle code information stored in a storage device of the server, and calculating the waiting distance based on the distance information between the foremost vehicle and the traffic light, the distance information between the waiting vehicles, and the longitudinal length of the vehicle.

The method may further include: determining, by the control unit, a speed profile group of the vehicle satisfying a speed profile of the vehicle including current speed information of the vehicle, deceleration target speed information of the vehicle, and an actual deceleration driving distance of the vehicle; checking, by the control unit, a drive motor torque limit according to a speed of the vehicle corresponding to each of a speed profile of the speed profile group of the vehicle and a gear ratio according to the speed of the vehicle; and determining, by the control unit, a speed profile of the vehicle in which a regenerative energy amount is maximized in the speed profile group of the vehicle based on the speed, the limit driving motor torque, and the gear ratio included in the speed profile of the speed profile group of the vehicle Another exemplary embodiment of the present disclosure provides a device for controlling deceleration of an environmentally friendly vehicle, including: a navigator providing distance information between the vehicle and the traffic light; and a control unit determining a reference deceleration driving distance of the vehicle based on current speed information of the vehicle and stop signal residual time information of a traffic light located ahead of the vehicle, wherein the control unit determines whether the reference deceleration driving distance is smaller than or equal to a distance between the vehicle and the traffic light, and the control unit determines a speed profile including an actual deceleration driving distance of the vehicle based on a waiting distance of a waiting vehicle waiting before the traffic light when the reference deceleration driving distance is smaller than or equal to the distance between the vehicle and the traffic light.

The speed profile may include an actual deceleration driving time of the vehicle calculated using the actual deceleration driving distance.

The stop signal residual time information of the traffic light may be provided by a server located outside the vehicle.

Each of the vehicle and the waiting vehicle may transmit code information of the vehicle and the waiting vehicle, distance information between a foremost vehicle among vehicles including the waiting vehicle and the traffic light, and distance information between the waiting vehicles to a server located outside the vehicle through wireless communication, and the server may determine a longitudinal length of the vehicle corresponding to code information of the vehicle and the waiting vehicle using a longitudinal length of the vehicle according to the vehicle code information stored in a storage device of the server, and calculate the waiting distance based on the distance information between the foremost vehicle and the traffic light, the distance information between the waiting vehicles, and the longitudinal length of the vehicle The control unit may determine a speed profile group of the vehicle satisfying a speed profile of the vehicle including current speed information of the vehicle, deceleration target speed information of the vehicle, and an actual deceleration driving distance of the vehicle, the control unit may check a drive motor torque limit according to a speed of the vehicle corresponding to each of a speed profile of the speed profile group of the vehicle and a gear ratio according to the speed of the vehicle, the control unit may determine a speed profile of the vehicle in which a regenerative energy amount is maximized in the speed profile group of the vehicle based on the speed, the limit driving motor torque, and the gear ratio included in the speed profile of the speed profile group of the vehicle, and the control unit may control a drive motor of the vehicle so that the vehicle is decelerated by coasting drive based on the determined speed profile of the vehicle.

The method and device for controlling deceleration of an environmentally friendly vehicle according to an exemplary embodiment of the present disclosure may determine a speed profile of a vehicle including an actual deceleration driving distance of a vehicle between the vehicle due to a traffic light and the traffic light based on traffic light information ahead of the vehicle and a standby distance of a vehicle which is waiting or stops before the traffic light in front of the vehicle. Therefore, since an accurate deceleration profile of the vehicle is determined, unnecessary acceleration and deceleration of the vehicle is prevented, thereby improving fuel efficiency of an environmentally friendly vehicle.

DRAWINGS

A brief description of the drawings will be provided in order to allow the drawings used in a detailed description of the present disclosure to be sufficiently understood.

DETAILED DESCRIPTION

Figure 1:
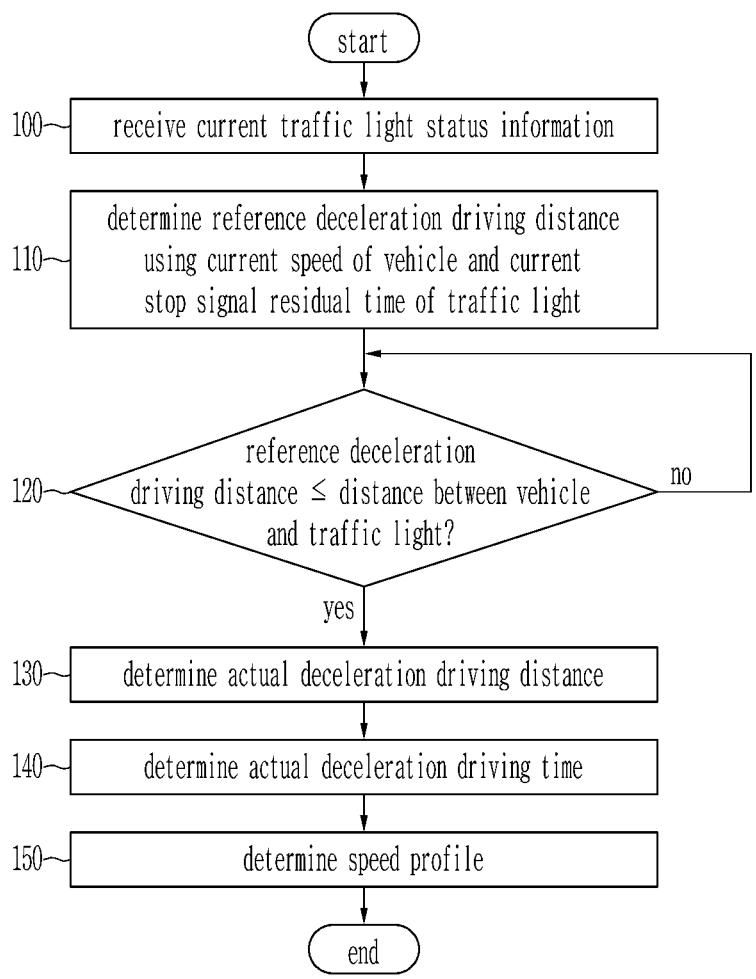
FIG. 1 is a flowchart illustrating a method for controlling deceleration of an environmentally friendly vehicle in one form of the present disclosure.

In order to sufficiently understand the present disclosure and objects accomplished by executing the present disclosure, reference should be made to the accompanying drawings illustrating exemplary embodiments of the present disclosure and contents described in the accompanying drawings.

Hereinafter, the present disclosure will be described in detail by describing exemplary embodiments of the present disclosure with reference to the accompanying drawings. Further, in describing the present disclosure, well-known configurations or functions will not be described in detail since they may unnecessarily obscure the gist of the present disclosure. Throughout the drawings, the same reference numerals will denote the same components.

Terms used in the present specification are used only in order to describe specific exemplary embodiments rather than limiting the present disclosure. Singular forms are to include plural forms unless the context clearly indicates otherwise. It should be understood that the terms "include" or "have" used in the present specification specify the presence of features, numerals, steps, operations, components, parts mentioned in the present specification, or a combination thereof, but do not preclude the presence or addition of one or more other features, numerals, steps, operations, components, parts, or a combination thereof.

Throughout the present specification, when any one portion is referred to as being "connected to" another portion, it means that any one portion and another portion are "directly connected to" each other or are "electrically or mechanically connected to" each other with the other component interposed therebetween.

Unless being defined otherwise, the terms used in the present specification including technical and scientific terms have the same meanings as those that are generally understood by a person of ordinary skill in the art. It should be understood that the terms defined by the dictionary are identical with the meanings within the context of the related art, and they should not be ideally or excessively formally defined unless the context clearly dictates otherwise.

In a vehicle control method according to the related art, in a situation in which a vehicle stop is expected according to traffic light information (red signal), the vehicle compares a distance between the vehicle and a traffic light and a coasting drive distance of the vehicle. When the coasting drive distance is less than or equal to the distance between the vehicle and the traffic light, the vehicle performs coasting drive, and when the coasting drive distance exceeds the distance between the vehicle and the traffic light, the vehicle performs regenerative braking.

Figure 2:
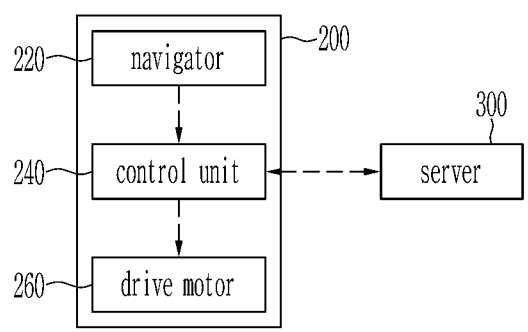
FIG. 2 is a block diagram illustrating an environmentally friendly vehicle to which the method for controlling deceleration of an environmentally friendly vehicle shown in FIG. 1 is applied.
Figure 3:
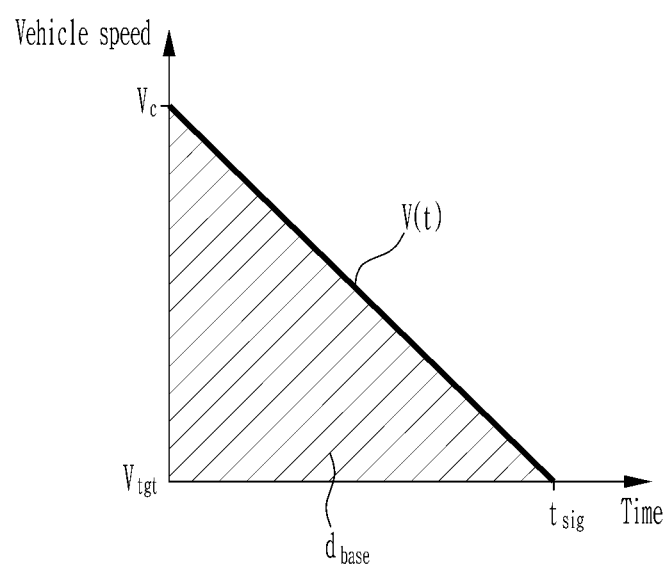
FIG. 3 is a graph illustrating a method for determining a reference deceleration driving distance of the vehicle shown in FIG. 1.
Figure 4:
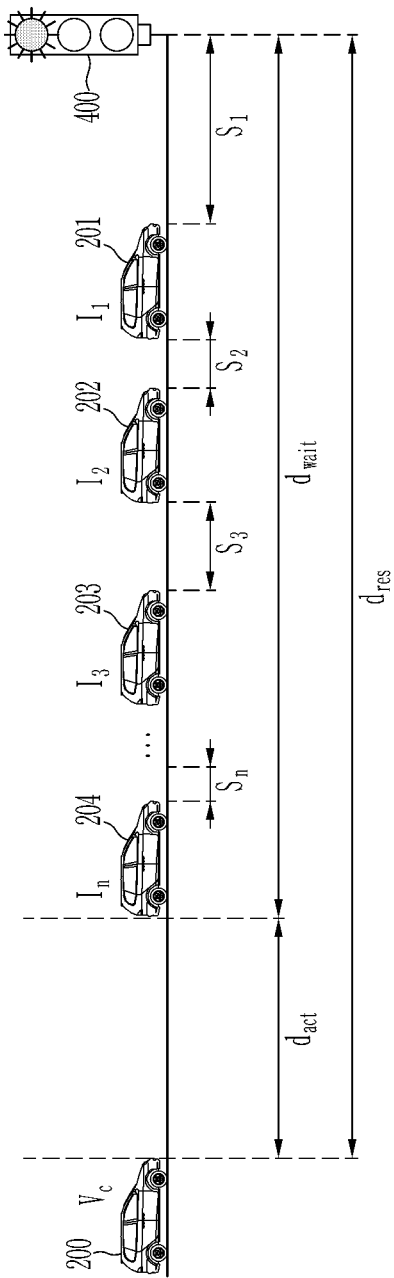
FIG. 4 is a diagram illustrating a method for determining an actual deceleration driving distance of the vehicle shown in FIG. 1.
Figure 5:
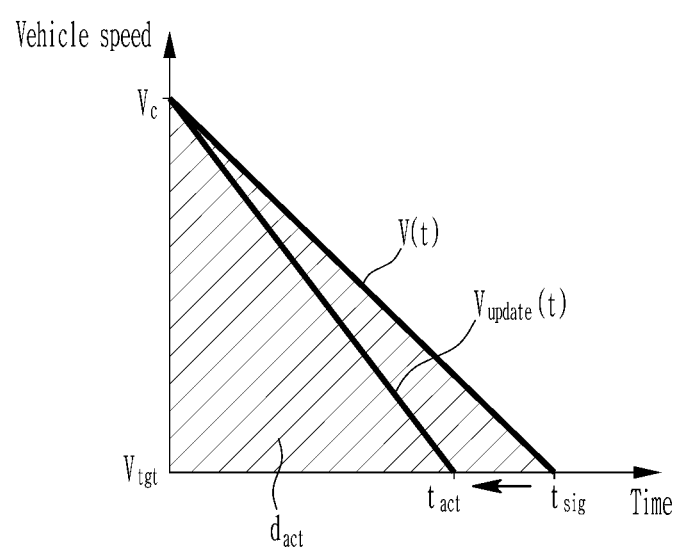
FIG. 5 is a graph illustrating a method for determining an actual deceleration driving time of the vehicle shown in FIG. 1.

FIG. 1 is a flowchart illustrating a method for controlling deceleration of an environmentally friendly vehicle in one form of the present disclosure. FIG. 2 is a block diagram illustrating an environmentally friendly vehicle to which the method for controlling deceleration of an environmentally friendly vehicle shown in FIG. 1 is applied. FIG. 3 is a graph illustrating a method for determining a reference deceleration driving distance of the vehicle shown in FIG. 1. FIG. 4 is a diagram illustrating a method for determining an actual deceleration driving distance of the vehicle shown in FIG. 1. FIG. 5 is a graph illustrating a method for determining an actual deceleration driving time of the vehicle shown in FIG. 1.

Referring to FIGS. 1 to 5, in a receiving step 100, a control unit 240 included in an environmentally friendly vehicle 200 may receive distance information ($d_{res}$) between the environmentally friendly vehicle and a traffic light 400 from a navigator (or a navigation device) 220. For example, the navigator 220 may receive the distance information ($d_{res}$) between the environmentally friendly vehicle 200 and the traffic light 400 from a server (e.g., a server of an intelligent transportation system (ITS) or a telematics server) installed (located) outside the vehicle.

The control unit 240 may receive traffic light information including current traffic light status information (e.g., red signal information, which is stop signal information) and current stop signal residual time information of the traffic light from the server 300 included in a road infrastructure (road-based communication facility).

The control unit 240 may receive current speed information of the environmentally friendly vehicle from a speed sensor of the environmentally friendly vehicle 200. The speed sensor may be mounted on a wheel of the environmentally friendly vehicle 200.

As shown in FIG. 2, the environmentally friendly vehicle 200 may include a navigator 220, a control unit 240, and a drive motor 260 such as an electric motor. The device for controlling deceleration of the environmentally friendly vehicle 200 may include the navigator 220 and a control unit 240.

The navigator 220 may include a global positioning system (GPS) receiver that generates location information of the environmentally friendly vehicle 200. For example, the navigator 220 may generate the distance information between the environmentally friendly vehicle and the traffic light 400 using road map information stored in the navigator and including location information of the traffic light and location information of the environmentally friendly vehicle 200.

The drive motor 260 may be operated as a generator in coasting drive of the environmentally friendly vehicle 200 to supply regenerative energy to a battery of the environmentally friendly vehicle. The battery may include a plurality of unit cells and store a high voltage of 350 V to 450 V of direct current, for example, for providing a voltage to a drive motor 260 providing driving power to a wheel (or drive wheel) of the environmentally friendly vehicle 200.

The control unit 240 is an electronic control unit (ECU) and may control an overall operation of the environmentally friendly vehicle 200. The control unit 240 may be, for example, one or more microprocessors operated by a program (control logic) or hardware (e.g., a microcomputer) including the microprocessor, and the program may include a series of instructions for performing the method for controlling deceleration of an environmentally friendly vehicle in one form of the present disclosure. The instructions may be stored in a memory of the vehicle 200 or the control unit 240.

According to step 110 shown in FIG. 1, as shown in FIG. 3, the control unit 240 may determine a reference deceleration driving distance ($d_{base}$) of the vehicle 200 based on current speed information ($V_c$) of the vehicle 200 and current stop signal residual time information ($t_{sig}$) of the traffic light 400 located ahead of the vehicle 200.

Referring to FIG. 3, assuming that the environmentally friendly vehicle 200 performs linear deceleration driving, a speed V(t) of the vehicle may be determined or calculated by the following equation.

$$v(t) = -\frac{v_c}{t_{stg}}t + v_c$$

In FIG. 3, a target deceleration speed ($V_{tgt}$) of the vehicle may be zero.

The reference deceleration driving distance ($d_{base}$) may be determined or calculated by the following equation.

$$d_{base} = \frac{1}{2}v_c t_{stg}$$

According to step 120, the control unit 240 may determine whether the reference deceleration driving distance ($d_{base}$) is less than or equal to the distance ($d_{res}$) between the vehicle 200 and the traffic light 400.

When the reference deceleration driving distance ($d_{base}$) exceeds the distance ($d_{res}$) between the vehicle 200 and the traffic light 400, the control unit 240 may accelerate or decelerate the vehicle in response to a request from a driver of the vehicle 200.

According to step 130, as shown in FIG. 4, when the reference deceleration distance ($d_{base}$) is less than or equal to the distance ($d_{res}$) between the vehicle 200 and the traffic light 400, the control unit 240 may determine an actual deceleration driving distance ($d_{act}$) of the vehicle 200 described in the equation below based on a waiting distance ($d_{wait}$) of a waiting vehicle 201, 202, 203, or 204 waiting before the traffic light 400.

$$d_{act} = d_{res} - d_{wait}$$

Referring to FIGS. 2 and 4, each of the vehicle 200 and the waiting vehicle 201, 202, 203, or 204 (or the control unit 240 of the vehicle and a control unit of the waiting vehicle) may transmit code information of the vehicle and the waiting vehicle, distance information ($S_2$) between a foremost vehicle 201 among vehicles including the waiting vehicle and the traffic light 400, and distance information ($S_2$, $S_3$, or $S_n$) between the waiting vehicles to a server 300 through wireless communication;

The n may be a natural number of 4 or greater. The waiting vehicle may include components similar to those of the vehicle 200.

The foremost vehicle 201 may calculate a distance between the traffic light 400 located at a stop line of the traffic light and the foremost vehicle using a navigator of the vehicle 201. Each of the vehicle 200 and the waiting vehicle 202, 203, or 204 may detect a distance ($S_2$, $S_3$, or $S_n$) between the vehicle and a front vehicle of the vehicle using a sensor (e.g., a radar) of the vehicle.

The server 300 may determine a longitudinal length ($I_1$, $I_2$, $I_3$, or $I_n$) of the vehicle corresponding to code information of the vehicle using a longitudinal length of the vehicle according to the vehicle code information stored in a storage device of the server, and determine or calculate the waiting distance ($d_{wait}$) described in the equation below in real time based on the distance information ($S_1$ between the foremost vehicle 201 and the traffic light 400, the distance information ($S_2$, $S_3$, or $S_n$) between the waiting vehicles, and the longitudinal length ($d_{wait}$) of the vehicle. The server 300 may transmit the waiting distance ($d_{wait}$) to the control unit 240 of the vehicle 200 through wireless communication.

$$d_{wait}=(s_1+l_1)+(s_2+l_2)+\ldots+(s_n+l_n)$$

According to step 140, as shown in FIG. 5, the control unit 240 may determine or calculate the actual deceleration driving time ($t_{act}$) of the vehicle 200 described in the equation below using the actual deceleration driving distance ($d_{act}$).

$$t_{act}=2d_{act}/V_c$$

In FIG. 5, a speed ($V_{update}(t)$) of the vehicle adjusted due to vehicle congestion may be determined or calculated by the equation below.

$$V_{update}(t)=-V_c*t/t_{act}+V_c$$

According to step 150, the control unit 240 may determine a speed profile of the vehicle including the actual deceleration driving distance ($d_{act}$) and the actual deceleration driving time ($t_{act}$). The control unit 240 may control the drive motor 260 of the environmentally friendly vehicle so that the environmentally friendly vehicle 200 may perform coasting drive or may be braked and decelerated based on the determined speed profile of the vehicle 200.

Figure 6:
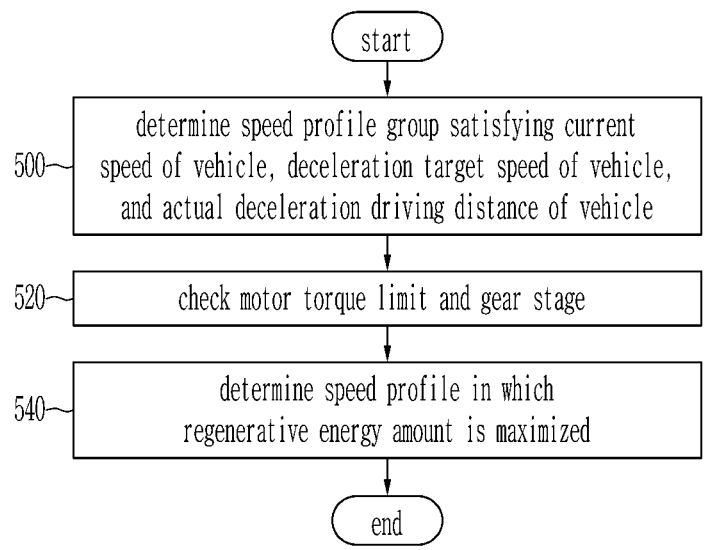
FIG. 6 is a flowchart illustrating a method for controlling deceleration of an environmentally friendly vehicle in one form of the present disclosure.

FIG. 6 is a flowchart illustrating a method for controlling deceleration of an environmentally friendly vehicle in some forms of the present disclosure. FIG. 6 shows a method for controlling deceleration of an environmentally friendly vehicle using the speed profile shown in FIG. 1 and may be applied to the environmentally friendly vehicle shown in FIG. 2.

Referring to FIG. 6, in determination step 500, the control unit 240 may determine a speed profile group (or preliminary speed profile group) satisfies the speed profile of the vehicle including the current speed information ($V_c$) of the vehicle 200, deceleration target speed information ($V_{tgt}$) (e.g., 0), and the actual deceleration driving distance $d_{act}$ of the vehicle.

According to step 520, the control unit 240 may check a drive motor torque limit according to a speed of the vehicle corresponding to each speed profile of the speed profile group of the vehicle 200 and a gear ratio (or gear stage) according to the speed of the vehicle. The drive motor torque limit according to the speed of the vehicle and the gear ratio according to the speed of the vehicle may be stored in the memory of the vehicle 200 or the control unit 240.

According to step 540, the control unit 240 may determine a speed profile of the vehicle in which a regenerative energy amount is maximized in the speed profile group of the vehicle 200 based on the speed, the limit driving motor torque, and the gear ratio, included in the speed profile of the speed profile group 200. The method for determining the speed profile of the vehicle may be determined by a test (or experiment) or an equation including a speed, a limit drive motor torque, and a gear ratio. The determined speed profile of the vehicle may include an actual deceleration driving time ($t_{act}$) of the vehicle 200. The control unit 240 may control the drive motor 260 of the environmentally friendly vehicle so that the environmentally friendly vehicle 200 may perform coasting drive or may be braked and decelerated based on the determined speed profile of the vehicle 200.

The components or "~unit" or block or module used in some forms of the present disclosure may be implemented by software components, such as tasks, classes, subroutines, processes, objects, execution threads, or programs, or by hardware components, such as field programmable gate array (FPGA) or application specific integrated circuit (ASIC), or by combinations of the software and hardware components. The components or "~unit" may be included in a computer-readable storage medium, or parts of the components may be distributed at a plurality of computers.

Hereinabove, exemplary embodiments have been disclosed in the accompanying drawings and the specification. In the present specification, although specific terms have been used, they are used only in order to describe the present disclosure and are not used in order to limit the meaning or the scope of the present disclosure, which is disclosed in the claims. Therefore, those skilled in the art will understand that various modifications and equivalent exemplary embodiments are possible from the present disclosure. Therefore, an actual technical protection scope of the present disclosure is to be defined by the claims.

DESCRIPTION OF SYMBOLS

220: navigator
240: control unit
260: drive motor
300: server

What is claimed is:

1. A method for controlling deceleration of a vehicle by a controller having one or more microprocessors operated by a program, the method comprising:
   receiving current speed information of the vehicle from a speed sensor;
   receiving stop signal residual time information of a traffic light located ahead of the vehicle from a server location outside the vehicle;
   determining a reference deceleration driving distance of the vehicle by using the one or more processors based on the current speed information of the vehicle and the stop signal residual time information of the traffic light located ahead of the vehicle;
   determining whether the reference deceleration driving distance is less than or equal to the distance between the vehicle and the traffic light by using the one or more processors;
   when it is determined that the reference deceleration driving distance is less than or equal to the distance between the vehicle and the traffic light, determining a speed profile including an actual deceleration driving distance of the vehicle by using the one or more processors based on a waiting distance of a waiting vehicle that waits before the traffic light; and
   controlling a drive motor of the vehicle to decelerate the vehicle by coasting drive based on the determined speed profile of the vehicle.

2. The method of claim 1, wherein determining the speed profile comprises:
   determining the speed profile including an actual deceleration driving time of the vehicle based on the actual deceleration driving distance of the vehicle.

3. The method of claim 1, further comprising:
   receiving the waiting distance from the server;
   wherein the waiting distance is calculated based on distance information between a foremost vehicle of a plurality of vehicles including the waiting vehicle and the traffic light, distance information between the waiting vehicle, and a longitudinal length of the vehicle;

wherein code information of the vehicle and the waiting vehicle, the distance information between the foremost vehicle of the plurality of vehicles including the waiting vehicle and the traffic light, and the distance information between the waiting vehicle are transmitted to the server through wireless communication; and wherein the longitudinal length of the vehicle corresponding to the code information of the vehicle and the waiting vehicle is determined by using a longitudinal length of the vehicle according to vehicle code information stored in a storage device of the server.

4. The method of claim 1, further comprising:

determining a speed profile group of the vehicle satisfying current speed information of the vehicle, deceleration target speed information of the vehicle, and an actual deceleration driving distance of the vehicle by using the one or more processors;

checking a drive motor torque limit according to a speed of the vehicle corresponding to the speed profile group of the vehicle and a gear ratio according to the speed of the vehicle by using the one or more processors; and determining a speed profile of the vehicle in which a regenerative energy amount is maximized based on the speed, the limit driving motor torque, and the gear ratio included in the speed profile of the speed profile group of the vehicle by using the one or more processors.

5. A device for controlling deceleration of a vehicle, the device comprising:

a navigator configured to provide distance information between the vehicle and a traffic light;

a drive motor configured to decelerate the vehicle by coasting drive based on the determined speed profile of the vehicle; and a controller having one or more processors operated by a program, the program having a series of instructions for the controller to:

receive current speed information of the vehicle from a speed sensor;

receive stop signal residual time information of the traffic light located ahead of the vehicle from a server located outside the vehicle;

determine a reference deceleration driving distance of the vehicle based on the current speed information of the vehicle and the stop signal residual time information of the traffic light located ahead of the vehicle;

determine whether the reference deceleration driving distance is less than or equal to the distance between the vehicle and the traffic light, and determine the speed profile including an actual deceleration driving distance of the vehicle based on a waiting distance of a waiting vehicle that waits before the traffic light when it is determined that the reference deceleration driving distance is less than or equal to the distance between the vehicle and the traffic light.

6. The device of claim 5, wherein the program further includes instructions for the controller to:

determine the speed profile including an actual deceleration driving time of the vehicle based on the actual deceleration driving distance of the vehicle.

7. The device of claim 5, wherein the program further includes instructions for the controller to:

receive the waiting distance from the server;

wherein the waiting distance is calculated based on distance information between a foremost vehicle of a plurality of vehicles including the waiting vehicle and the traffic light, distance information between the waiting vehicle, and a longitudinal length of the vehicle, wherein code information of the vehicle and the waiting vehicle, the distance information between the foremost vehicle of the plurality of vehicles including the waiting vehicle and the traffic light, and the distance information between the waiting vehicle are transmitted to the server through wireless communication, wherein the longitudinal length of the vehicle corresponding to the code information of the vehicle and the waiting vehicle is determined by using a longitudinal length of the vehicle according to vehicle code information stored in a storage device of the server.

8. The device of claim 5, wherein the program further includes instructions for the controller to:

determine a speed profile group of the vehicle current speed information of the vehicle, deceleration target speed information of the vehicle, and an actual deceleration driving distance of the vehicle;

check a drive motor torque limit according to a speed of the vehicle corresponding to the speed profile group of the vehicle and a gear ratio according to the speed of the vehicle; and determine a speed profile of the vehicle in which a regenerative energy amount is maximized based on the speed, the limit driving motor torque, and the gear ratio included in the speed profile of the speed profile group of the vehicle.

* * * * *